(12) United States Patent
Cheng

(10) Patent No.: US 8,593,258 B2
(45) Date of Patent: Nov. 26, 2013

(54) HIGH-TENSILE BELT-TYPE TAG AND WIRELESS RADIO FREQUENCY IDENTIFICATION SYSTEM EMPLOYING THE SAME

(75) Inventor: Min-Yuan Cheng, Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 849 days.

(21) Appl. No.: 12/758,779

(22) Filed: Apr. 12, 2010

(65) Prior Publication Data
US 2010/0277288 A1    Nov. 4, 2010

(30) Foreign Application Priority Data
Apr. 29, 2009   (TW) ............................. 98114229 A (51) Int. Cl.
*H04Q 5/22*    (2006.01)
(52) U.S. Cl.
USPC .................. 340/10.42; 340/10.1; 340/572.1
(58) Field of Classification Search
USPC ............ 340/10.1, 10.3, 10.31, 10.32, 10.4, 340/10.41, 10.5, 572.1, 572.7, 572.3
See application file for complete search history.

(56) References Cited

U.S. PATENT DOCUMENTS

| 7,202,788 B2 | 4/2007 | Shieh et al. | |
| 2005/0263602 A1* | 12/2005 | Lin et al. | 235/492 |
| 2007/0146140 A1* | 6/2007 | Nagao et al. | 340/572.8 |
| 2009/0027168 A1* | 1/2009 | Tuttle | 340/10.2 |
| 2011/0148582 A1* | 6/2011 | Ritamaki | 340/10.1 |

FOREIGN PATENT DOCUMENTS

| TW | M289273 | 4/2006 |
| TW | I253911 | 5/2006 |
| TW | 200701550 | 1/2007 |
| TW | M305859 | 2/2007 |

OTHER PUBLICATIONS

"Office Action of Taiwan Counterpart Application", issued on Oct. 15, 2012, p1-p6.

* cited by examiner

*Primary Examiner* — Nabil Syed
(74) *Attorney, Agent, or Firm* — Jianq Chyun IP Office (57) ABSTRACT

A high-tensile belt-type tag including a belt, a high-tensile transmission line, an antenna and a radio frequency identification (RFID) chip is provided, wherein the belt includes a belt body and a retaining ring. The belt body is suitable to slip into an opening of the retaining ring and preventing the belt body from slipping out of the opening. The high-tensile transmission line, the antenna and the RFID chip are disposed in the belt, and the high-tensile transmission line encircles the whole belt in accordance with a shape of the belt. Moreover, the RFID chip is coupled to the antenna through the high-tensile transmission line, wherein when the high-tensile transmission line is split as the belt is cut off, the RFID chip cannot delivers an identification code through the antenna due to split of the high-tensile transmission line.

16 Claims, 8 Drawing Sheets

HIGH-TENSILE BELT-TYPE TAG AND WIRELESS RADIO FREQUENCY IDENTIFICATION SYSTEM EMPLOYING THE SAME

CROSS-REFERENCE TO RELATED APPLICATION

This application claims the priority benefit of Taiwan application serial no. 98114229, filed on Apr. 29, 2009. The entirety of the above-mentioned patent application is hereby incorporated by reference herein and made a part of specification.

BACKGROUND OF THE INVENTION

1. Field of the Invention

The present invention relates to a belt-type tag and a wireless radio frequency identification system using the same. More particularly, the present invention relates to a high-tensile belt-type tag with an increasing belt tensile strength and a wireless radio frequency identification system using the same.

2. Description of Related Art

In recent years, a radio frequency identification (RFID) technology has been used to gradually replace a current bar code technology due to its advantages of non-contact identification and data security, etc., and the RFID technology is widely used in various domains such as inventory management, vehicle automatic identification, shop's theft prevention and logistics control, etc.

Generally, a transmission frequency of the RFID system has three types of low frequency, high frequency and super high frequency, so that a designer can use the RFID system with a different transmission frequency according to an actual requirement. Moreover, in an actual application, the RFID system mainly includes a reader and an RFID tag. Wherein, antennas are configured in the reader and the RFID tag to facilitate the wireless radio frequency transmission, and designs of the antennas can be adjusted and enhanced according to an actual utilization requirement. Moreover, an RFID chip in internal of the RFID tag can be used for identity recognition.

However, it should be noticed that in most of the current RFID systems, the RFID tag is fixed on commodity to be identified through adhesion. In this case, a theft can easily remove the RFID tag from the commodity to steal such commodity or replace it with a fake one. In other words, an anti-counterfeiting function and an anti-theft function of the current RFID system are extremely weak, so that the thefts can take advantage of the weakness to make profits.

SUMMARY OF THE INVENTION

The present invention is directed to a high-tensile belt-type tag, which has an increasing belt tensile strength, and can be applied in applications of commodity tracing, identifying and monitoring.

The present invention is directed to a wireless radio frequency identification (RFID) system, which applies a high-tensile belt-type tag to achieve a perfect anti-counterfeiting and anti-theft mechanism.

The present invention provides a high-tensile belt-type tag including a belt, a high-tensile transmission line, an antenna and a radio frequency identification (RFID) chip, wherein the belt includes a belt body and a retaining ring. The belt body is suitable to slip into an opening of the retaining ring for preventing the belt body from slipping out of the opening. The high-tensile transmission line, the antenna and the RFID chip are disposed in the belt, and the high-tensile transmission line encircles the whole belt in accordance with a shape of the belt. Moreover, the RFID chip is electrically coupled to the antenna through the high-tensile transmission line, wherein when the high-tensile transmission line is split as the belt is cut off, the RFID chip is unable to deliver an identification code through the antenna due to split of the high-tensile transmission line.

In an embodiment of the present invention, the high-tensile belt-type tag further includes an impedance matching circuit disposed in the belt and electrically coupled between the antenna and the RFID chip through the high-tensile transmission line. Wherein, the impedance matching circuit is used for matching an impedance of the antenna to an impedance of the RFID chip. Moreover, the antenna, the RFID chip and the impedance matching circuit are disposed in the belt body. The high-tensile transmission line is distributed in the belt body and the retaining ring for electrically connecting the antenna, the impedance matching circuit and the RFID chip, sequentially.

In an embodiment of the present invention, the high-tensile belt-type tag further includes a loop short-circuit device fixed in the opening of the retaining ring and electrically connected to two non-conducted line segments in the high-tensile transmission line. Wherein, the loop short-circuit device can prevent normal operations of the RFID chip and the antenna. Moreover, when the belt body is slipped into the opening of the retaining ring, the loop short-circuit device is squeezed by the belt body and is split, so that the RFID chip and the antenna are able to normally operate.

In an embodiment of the present invention, a material of the belt body includes plastic, rubber, silicone, synthetic materials or polymeric materials. Moreover, the high-tensile transmission line is a steel cable. In addition, the RFID chip is a passive RFID chip, so that miniaturization and low cost of the high-tensile belt-type tag are achieved. Moreover, the RFID chip can also be an active RFID chip, so that efficiency and reliability of data transmission of the high-tensile belt-type tag are improved.

The present invention provides a wireless RFID system including a plurality of high-tensile belt-type tags and a reader. The reader is used for reading identification codes sent by the high-tensile belt-type tags, and objects that are bundled by the high-tensile belt-type tags are identified according to a read result. It should be noticed that when the reader is unable to receive the identification codes sent by the high-tensile belt-type tags, the reader determines that the objects that are bundled by the high-tensile belt-type tags have been stolen or replaced.

According to the above descriptions, in the present invention, the high-tensile transmission line is used to improve a tensile strength of the belt, so as to increase an application level of the belt. Moreover, based on a mechanism that the belt can only be tightened and cannot be loosed, and the high-tensile transmission line encircled the whole belt in accordance with a shape of the belt, the belt and the high-tensile transmission line have to be simultaneously cut off in order to remove the high-tensile belt-type tag. In this way, compared to the conventional technique, the high-tensile belt-type tag of the present invention is not only widely used, but also has the anti-counterfeiting and anti-theft functions.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 1:
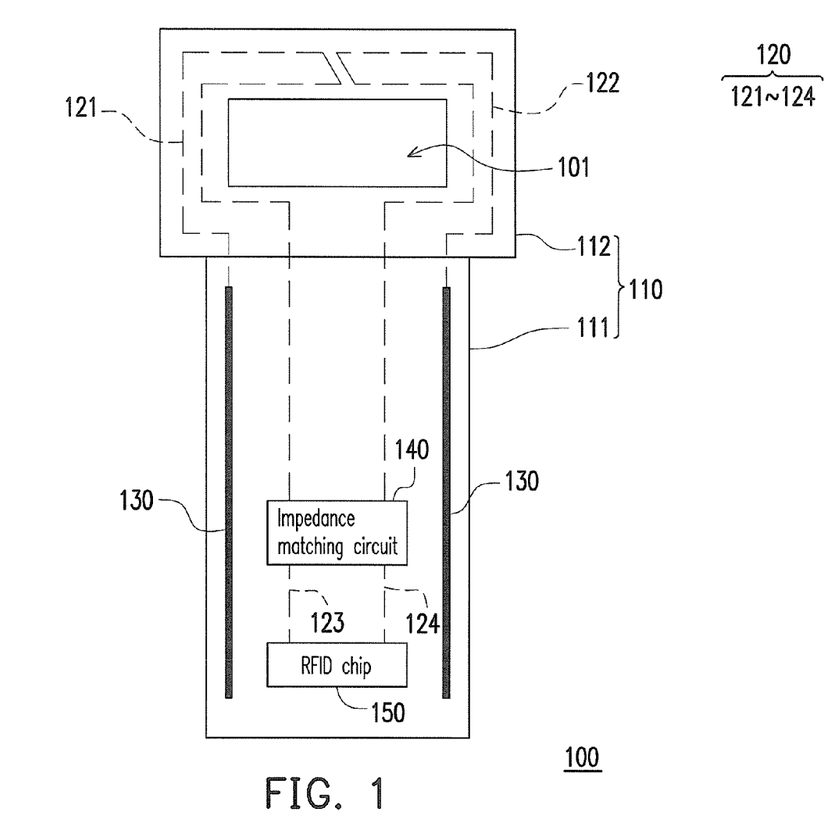
FIG. 1 is an internal structural diagram illustrating a high-tensile belt-type tag according to a first embodiment of the present invention.

FIG. 1 is an internal structural diagram illustrating a high-tensile belt-type tag according to a first embodiment of the present invention. Referring to FIG. 1, the high-tensile belt-type tag 100 includes a belt 110, a high-tensile transmission line 120, an antenna 130, an impedance matching circuit 140 and a radio frequency identification (RFID) chip 150. The high-tensile transmission line 120, the antenna 130, the impedance matching circuit 140 and the RFID chip 150 are all disposed in the belt 110. Moreover, the belt 110 includes a belt body 111 and a retaining ring 112.

Regarding an internal structure of the high-tensile belt-type tag 100, the antenna 130, the impedance matching circuit 140 and the RFID chip 150 are all disposed in the belt body 111, and the high-tensile transmission line 120 is simultaneously distributed in the belt body 111 and the retaining ring 112. It should be noticed that since the high-tensile transmission line 120 encircles the whole belt 110 in accordance with a shape of the belt 110, the high-tensile transmission line 120 can serve as a communication bridge among the antenna 130, the impedance matching circuit 140 and the RFID chip 150.

For example, in the present embodiment, the high-tensile transmission line 120 includes a plurality of line segments 121-124, wherein the line segments 121-124 are not mutually conducted. Moreover, the line segments 121 and 122 are respectively connected between the antenna 130 and the impedance matching circuit 140, and the line segments 123 and 124 are respectively connected between the impedance matching circuit 140 and the RFID chip 150. Namely, the high-tensile transmission line 120 electrically connects the antenna 130, the impedance matching circuit 140 and the RFID chip 150, sequentially. In this way, signal transmission among the antenna 130, the impedance matching circuit 140 and the RFID chip 150 can be implemented through the high-tensile transmission line 120.

During an actual operation, the antenna 130 is used for sending or receiving radio frequency signals. The impedance matching circuit 140 is used for matching an impedance of the antenna 130 with an impedance of the RFID chip 150. Moreover, the RFID chip 150 can process the signal received by the antenna 130, and can send an identification code through the antenna 130 according to a processing result. In this way, the high-tensile belt-type tag 100 can be used in applications of commodity tracing, identifying and monitoring, for example, aviation and freight transport, inventory management, vehicle automatic identification, and logistics control, etc.

Figure 2:
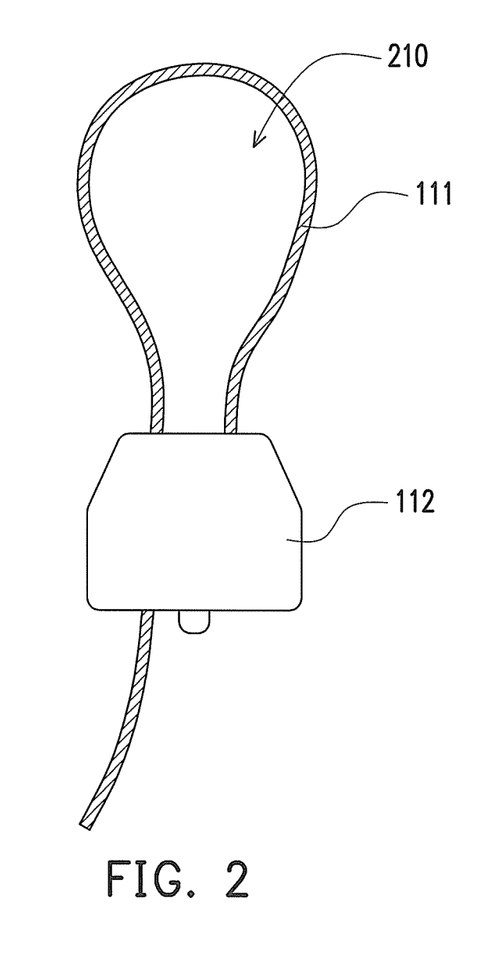
FIG. 2 is a physical structural diagram illustrating a high-tensile belt-type tag according to a first embodiment of the present invention.

Regarding an external structure of the high-tensile belt-type tag 100, FIG. 2 is a physical structural diagram illustrating the high-tensile belt-type tag according to the first embodiment of the present invention. Referring to FIG. 2, the belt body 111 can slip into an opening 101 of the retaining ring 112. Moreover, after the belt body 111 slips into the opening 101, it cannot slip out from the opening 101. In other words, after the belt body 111 slips into the opening 101 of the retaining ring 112, the belt 110 forms a ring-shape opening 210, and a size of the ring-shape opening 210 is decreased as the belt body 111 continually slips into the retaining ring 112. In this way, the belt 110 can be used to bundle an object to be identified through the ring-shape opening 210. Moreover, since the ring-shape opening 210 can be used to tighten the object to be identified, the high-tensile belt-type tag 100 can be fixed on the object to be identified.

It should be noticed that since high-tensile transmission line 120 has the high-tensile strength, a tensile strength of the belt 110 is increased, so that an application level of the belt 110 is increased. Here, the high-tensile transmission line 120 can be formed by a conductive component with a high-tensile strength, for example, a steel cable. Moreover, to maintain a transmission quality of the high-tensile transmission line 120, a better transmission material can be used to wrap the high-tensile transmission line 120, or the better transmission material can be mixed and twisted with the high-tensile transmission line 120 or disposed in the high-tensile transmission line 120. In other words, the high-tensile transmission line 120 can be a high-tensile steel cable having a function of a transmission line or can be formed by mixing and twisting a transmission line with the high-tensile steel cable. Although several implementation patterns of the high-tensile transmission line 120 are provided in the present embodiment, the present invention is not limited thereto, and those skilled in the art can arbitrarily modify the implementation pattern of the high-tensile transmission line 120 according to actual design requirements.

Referring to FIG. 1 again, when the high-tensile belt-type tag 100 is fixed on the object to be identified, the high-tensile transmission line 120 disposed in the belt 110 also encircles the object to be identified. It should be noticed that after the high-tensile belt-type tag 100 bundles the object to be identified, it can only be tightened and cannot be loosed. Therefore, if the high-tensile belt-type tag 100 is required to be removed from the object to be identified, the belt 110 and the high-tensile transmission line 120 have to be simultaneously cut off.

In other words, when the belt 110 is cut off due to an external force, the high-tensile transmission line 120 is also split. Now, the communication bridge between the RFID chip 150 and the antenna 130 is spoiled, so that the RFID chip 150 cannot deliver the identification code through the antenna 130. In this way, when a theft removes the high-tensile belt-type tag 100 from the object to be identified, the split high-tensile transmission line 120 can indicate that the object to be identified has been stolen or replaced by a fake one. Therefore, a system using the high-tensile belt-type tags 100 may have an anti-counterfeiting function and an anti-theft function.

On the other hand, in the present embodiment, a material of the belt body 111 can be plastic, rubber, silicone, synthetic materials or polymeric materials. Moreover, the RFID chip 150 can be a passive RFID chip or an active RFID chip. Wherein, if the RFID chip 150 is the passive RFID chip, the high-tensile belt-type tag 100 has advantages of miniaturization and low cost. Comparatively, if the RFID chip 150 is the active RFID chip, efficiency and reliability of data transmission of the high-tensile belt-type tag 100 can be improved.

Second Embodiment

Figure 3:
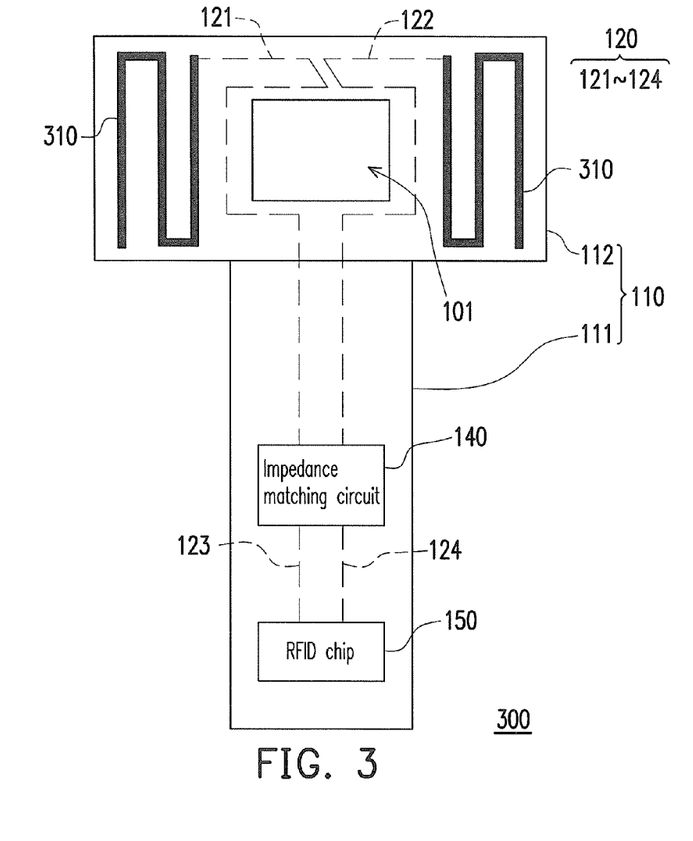
FIG. 3 is an internal structural diagram illustrating a high-tensile belt-type tag according to a second embodiment of the present invention.

FIG. 3 is an internal structural diagram illustrating a high-tensile belt-type tag according to a second embodiment of the present invention. Referring to FIG. 3, a main difference between the present embodiment and the first embodiment lies in a disposing position of an antenna 310 in the belt 110.

In detail, the antenna 310 is disposed in the retaining ring 112, and the impedance matching circuit 140 and the RFID chip 150 are disposed in the belt body 111. Similarly, the high-tensile transmission line 120 is simultaneously distributed in the belt body 111 and the retaining ring 112, and encircles the whole belt 110 in accordance with the shape of the belt 110. Regarding the electrical connections, the high-tensile transmission line 120 sequentially connects the antenna 310, the impedance matching circuit 140 and the RFID chip 150. Therefore, the high-tensile transmission line 120 can serve as a communication bridge among the antenna 310, the impedance matching circuit 140 and the RFID chip 150.

On the other hand, similar to the first embodiment, the high-tensile belt-type tag 300 can be fixed on the object to be identified, and the high-tensile transmission line 120 can increase the tensile strength of the belt 110, so as to increase the application level of the belt 110. Moreover, when the theft removes the high-tensile belt-type tag 300 from the object to be identified, the RFID 150 cannot deliver the identification code through the antenna 310, so that the anti-counterfeiting and anti-theft functions are achieved. The other detailed working principles of the present embodiment are similar to that of the first embodiment, and therefore detailed descriptions thereof are not repeated.

Third Embodiment

Figure 4:
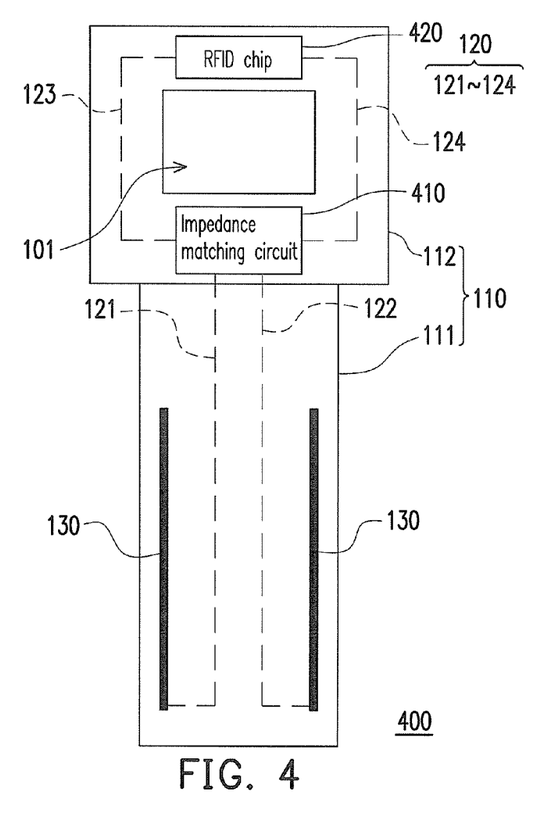
FIG. 4 is an internal structural diagram illustrating a high-tensile belt-type tag according to a third embodiment of the present invention.

FIG. 4 is an internal structural diagram illustrating a high-tensile belt-type tag according to a third embodiment of the present invention. Referring to FIG. 4, a main difference between the present embodiment and the first embodiment lies in disposing positions of an impedance matching circuit 410 and an RFID chip 420 in the belt 110.

In detail, the impedance matching circuit 410 and the RFID chip 420 are disposed in the retaining ring 112, and the antenna 113 is disposed in the belt body 111. Similarly, the high-tensile transmission line 120 is simultaneously distributed in the belt body 111 and the retaining ring 112, and encircles the whole belt 110 in accordance with the shape of the belt 110. Regarding the electrical connections, the high-tensile transmission line 120 sequentially connects the antenna 130, the impedance matching circuit 410 and the RFID chip 420. Moreover, as the disposing positions of the impedance matching circuit 410 and the RFID chip 420 are changed, the line segments 123 and 124 in the high-tensile transmission line 120 may surround the opening 101.

On the other hand, similar to the first embodiment, the high-tensile belt-type tag 400 can be fixed on the object to be identified, and the high-tensile transmission line 120 can increase the tensile strength of the belt 110, so as to increase the application level of the belt 110. Moreover, when the theft removes the high-tensile belt-type tag 400 from the object to be identified, the RFID chip 420 cannot deliver the identification code through the antenna 130, so that the anti-counterfeiting and anti-theft functions are achieved. The other detailed working principles of the present embodiment are similar to that of the aforementioned embodiments, and therefore detailed descriptions thereof are not repeated.

Fourth Embodiment

Figure 5:
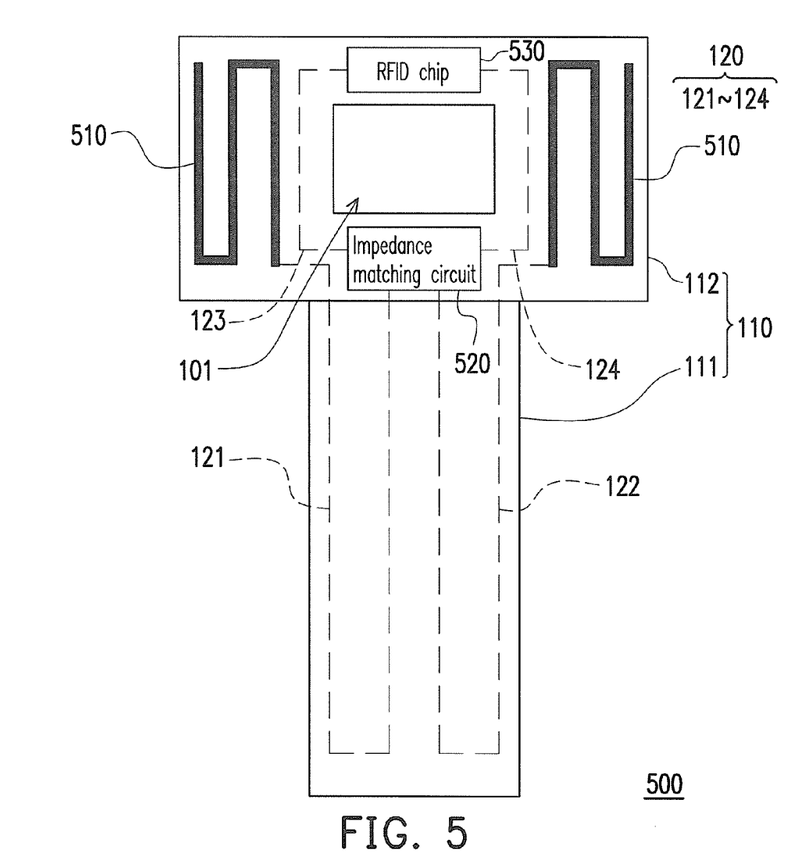
FIG. 5 is an internal structural diagram illustrating a high-tensile belt-type tag according to a fourth embodiment of the present invention.

FIG. 5 is an internal structural diagram illustrating a high-tensile belt-type tag according to a fourth embodiment of the present invention. Referring to FIG. 5, a main difference between the present embodiment and the first embodiment lies in disposing positions of an antenna 510, an impedance matching circuit 520 and an RFID chip 530 in the belt 110.

In detail, the antenna 510, the impedance matching circuit 520 and the RFID chip 530 are disposed in the retaining ring 112, and the high-tensile transmission line 120 is simultaneously disposed in the belt body 111 and the retaining ring 112. Since the high-tensile transmission line 120 encircles the whole belt 110 in accordance with the shape of the belt 110, the high-tensile transmission line 120 electrically connects the antenna 510, the impedance matching circuit 520 and the RFID chip 530, sequentially. As the disposing positions of the antenna 510, the impedance matching circuit 520 and the RFID chip 530 are changed, the line segments 123 and 124 in the high-tensile transmission line 120 may surround the opening 101.

On the other hand, similar to the first embodiment, the high-tensile belt-type tag 500 can be fixed on the object to be identified, and the high-tensile transmission line 120 can increase the tensile strength of the belt 110, so as to increase the application level of the belt 110. Moreover, when the theft removes the high-tensile belt-type tag 500 from the object to be identified, the RFID chip 530 cannot deliver the identification code through the antenna 510, so that the anti-counterfeiting and anti-theft functions are achieved. The other detailed working principles of the present embodiment are similar to that of the aforementioned embodiments, and therefore detailed descriptions thereof are not repeated.

Fifth Embodiment

Figure 6:
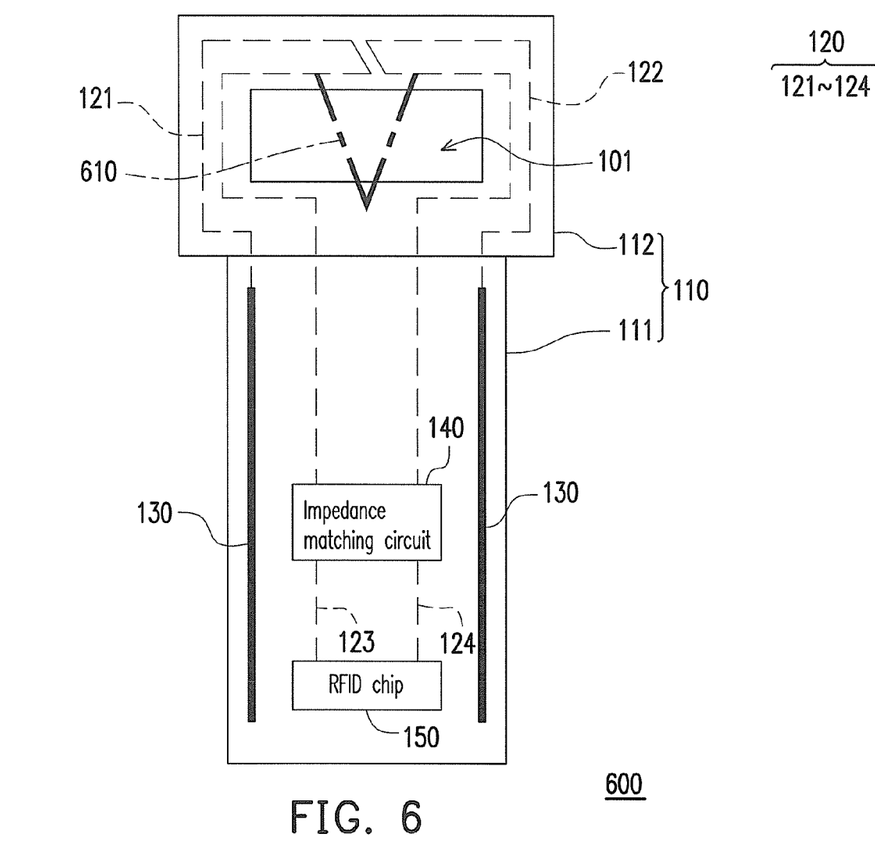
FIG. 6 is an internal structural diagram illustrating a high-tensile belt-type tag according to a fifth embodiment of the present invention.

FIG. 6 is an internal structural diagram illustrating a high-tensile belt-type tag according to a fifth embodiment of the present invention. Referring to FIG. 6, a main difference between the present embodiment and the first embodiment is that the high-tensile belt-type tag 600 further includes a loop short-circuit device 610, so as to form an activation mechanism of the belt-type tag.

In detail, the loop short-circuit device 610 is fixed in the opening 101 of the retaining ring 112, and is electrically connected to two non-conducted line segments 121 and 122 in the high-tensile transmission line 120. In this way, the two originally non-conducted segment lines 121 and 122 are short-circuited through the loop short-circuit device 610, so that the RFID chip 150 and the antenna 130 cannot normally operate.

However, when the belt body 111 is slipped into the opening 101 of the retaining ring 112, the loop short-circuit device 610 is squeezed by the belt body 111 and is split. Now, the two originally non-conducted segment lines 121 and 122 are not short-circuited, so that the RFID chip 150 and the antenna 130 can normally operate. In other words, due to a function of the loop short-circuit device 610, the high-tensile belt-type tag 600 cannot normally operate before being bundled to the object to be identified. Comparatively, after the high-tensile belt-type tag 600 is fixed on the object to be identified, it is activated.

On the other hand, similar to the first embodiment, the high-tensile belt-type tag 600 can be fixed on the object to be identified, and the high-tensile transmission line 120 can increase the tensile strength of the belt 110, so as to increase the application level of the belt 110. Moreover, when the theft removes the high-tensile belt-type tag 600 from the object to be identified, the RFID chip 150 cannot deliver the identification code through the antenna 130, so that the anti-counterfeiting and anti-theft functions are achieved. The other detailed working principles of the present embodiment are similar to that of the aforementioned embodiments, and therefore detailed descriptions thereof are not repeated.

Sixth Embodiment

Figure 7:
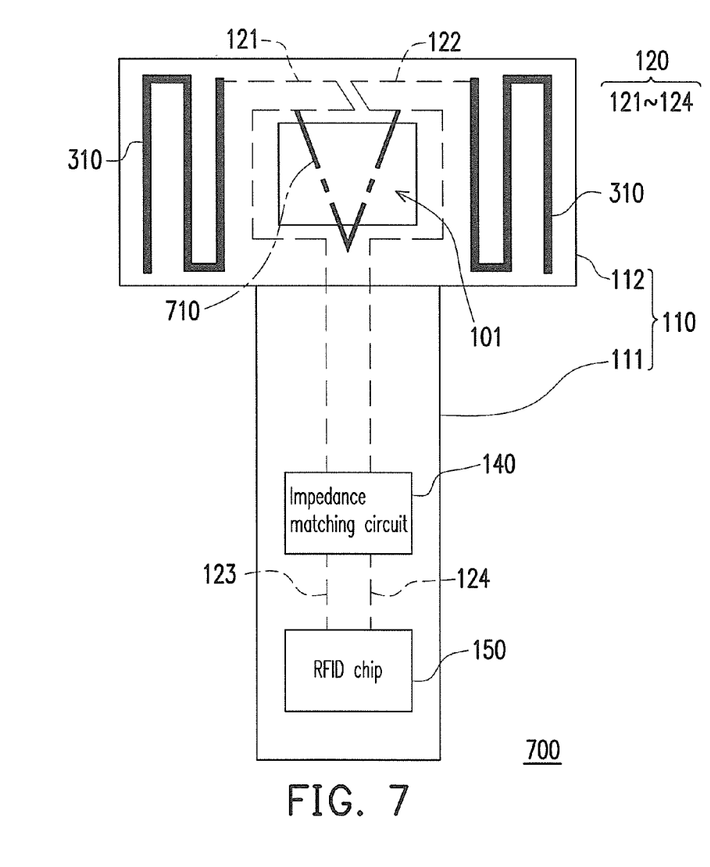
FIG. 7 is an internal structural diagram illustrating a high-tensile belt-type tag according to a sixth embodiment of the present invention.

FIG. 7 is an internal structural diagram illustrating a high-tensile belt-type tag according to a sixth embodiment of the present invention. The present embodiment is an extension of the second embodiment. Referring to FIG. 3 and FIG. 7, a main difference between the present embodiment and the second embodiment (FIG. 3) is that the high-tensile belt-type tag 700 further includes a loop short-circuit device 710, so as to form an activation mechanism of the belt-type tag.

In detail, the loop short-circuit device 710 is fixed in the opening 101 of the retaining ring 112, and is electrically connected to two non-conducted line segments 121 and 122 in the high-tensile transmission line 120. In this way, the two originally non-conducted segment lines 121 and 122 are short-circuited through the loop short-circuit device 710, so that the RFID chip 150 and the antenna 310 cannot normally operate. However, when the belt body 111 is slipped into the opening 101 of the retaining ring 112, the loop short-circuit device 710 is squeezed by the belt body 111 and is split, so that the RFID chip 150 and the antenna 310 can normally operate.

On the other hand, similar to the second embodiment (FIG. 3), the high-tensile belt-type tag 700 can be fixed on the object to be identified, and the high-tensile transmission line 120 can increase the tensile strength of the belt 110. Moreover, when the theft removes the high-tensile belt-type tag 700 from the object to be identified, the RFID chip 150 cannot deliver the identification code through the antenna 310, so that the anti-counterfeiting and anti-theft functions are achieved. The other detailed working principles of the present embodiment are similar to that of the aforementioned embodiments, and therefore detailed descriptions thereof are not repeated.

Seventh Embodiment

Figure 8:
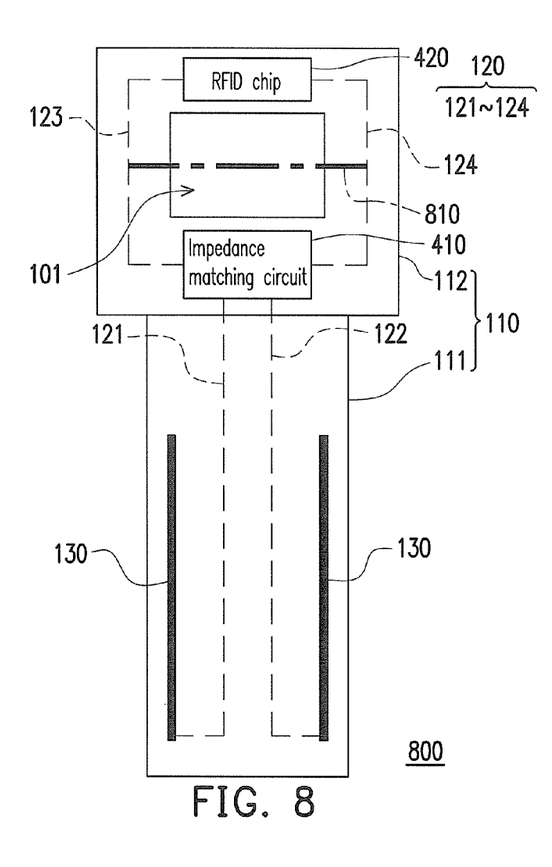
FIG. 8 is an internal structural diagram illustrating a high-tensile belt-type tag according to a seventh embodiment of the present invention.

FIG. 8 is an internal structural diagram illustrating a high-tensile belt-type tag according to a seventh embodiment of the present invention. The present embodiment is an extension of the third embodiment. Referring to FIG. 4 and FIG. 8, a main difference between the present embodiment and the third embodiment (FIG. 4) is that the high-tensile belt-type tag 800 further includes a loop short-circuit device 810, so as to form an activation mechanism of the belt-type tag.

In detail, the loop short-circuit device 810 is fixed in the opening 101 of the retaining ring 112, and is electrically connected to two non-conducted line segments 123 and 124 in the high-tensile transmission line 120. In this way, the two originally non-conducted segment lines 123 and 124 are short-circuited through the loop short-circuit device 810, so that the RFID chip 420 and the antenna 130 cannot normally operate. However, when the belt body 111 is slipped into the opening 101 of the retaining ring 112, the loop short-circuit device 810 is squeezed by the belt body 111 and is split, so that the RFID chip 420 and the antenna 130 can normally operate.

On the other hand, similar to the third embodiment (FIG. 4), the high-tensile belt-type tag 800 can be fixed on the object to be identified, and the high-tensile transmission line 120 can increase the tensile strength of the belt 110. Moreover, when the theft removes the high-tensile belt-type tag 800 from the object to be identified, the RFID chip 420 cannot deliver the identification code through the antenna 130, so that the anti-counterfeiting and anti-theft functions are achieved. The other detailed working principles of the present embodiment are similar to that of the aforementioned embodiments, and therefore detailed descriptions thereof are not repeated.

Eighth Embodiment

Figure 9:
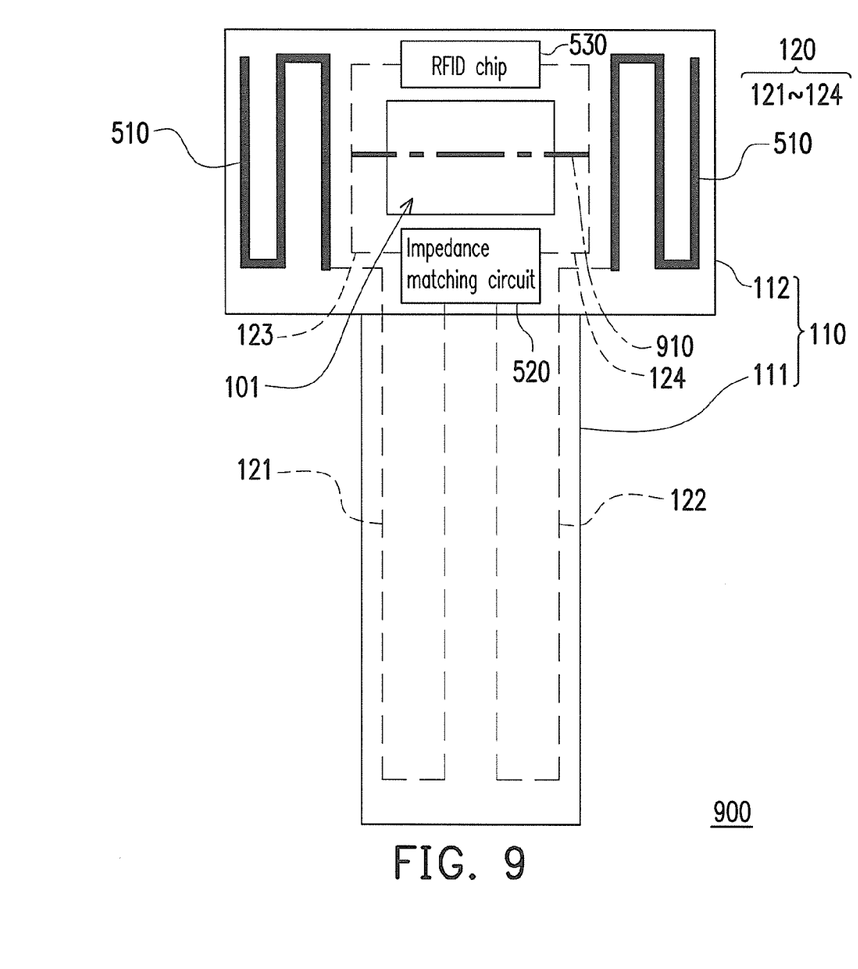
FIG. 9 is an internal structural diagram illustrating a high-tensile belt-type tag according to an eighth embodiment of the present invention.

FIG. 9 is an internal structural diagram illustrating a high-tensile belt-type tag according to an eighth embodiment of the present invention. The present embodiment is an extension of the fourth embodiment. Referring to FIG. 5 and FIG. 9, a main difference between the present embodiment and the fourth embodiment (FIG. 5) is that the high-tensile belt-type tag 900 further includes a loop short-circuit device 910, so as to form an activation mechanism of the belt-type tag.

In detail, the loop short-circuit device 910 is fixed in the opening 101 of the retaining ring 112, and is electrically connected to two non-conducted line segments 123 and 124 in the high-tensile transmission line 120. In this way, the two originally non-conducted segment lines 123 and 124 are short-circuited through the loop short-circuit device 910, so that the RFID chip 530 and the antenna 510 cannot normally operate. However, when the belt body 111 is slipped into the opening 101 of the retaining ring 112, the loop short-circuit device 910 is squeezed by the belt body 111 and is split, so that the RFID chip 530 and the antenna 510 can normally operate.

On the other hand, similar to the fourth embodiment (FIG. 5), the high-tensile belt-type tag 900 can be fixed on the object to be identified, and the high-tensile transmission line 120 can increase the tensile strength of the belt 110. Moreover, when the theft removes the high-tensile belt-type tag 900 from the object to be identified, the RFID chip 530 cannot deliver the identification code through the antenna 510, so that the anti-counterfeiting and anti-theft functions are achieved. The other detailed working principles of the present embodiment are similar to that of the aforementioned embodiments, and therefore detailed descriptions thereof are not repeated.

Ninth Embodiment

Figure 10:
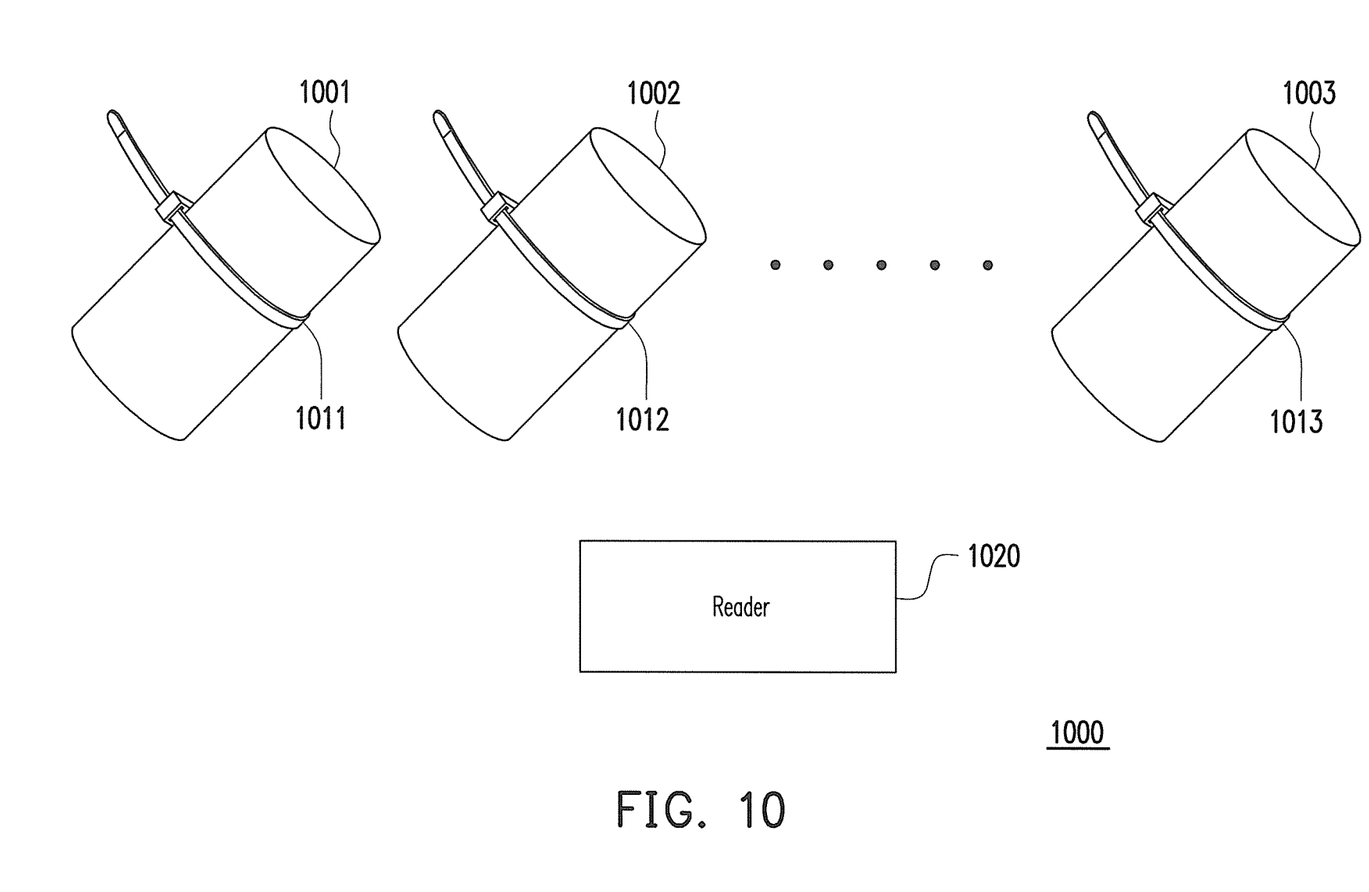
FIG. 10 is a system structural diagram illustrating a wireless radio frequency identification (RFID) system according to a ninth embodiment of the present invention.

FIG. 10 is a system structural diagram illustrating a wireless RFID system according to a ninth embodiment of the present invention. Referring to FIG. 10, the wireless RFID system 1000 includes a plurality of high-tensile belt-type tags 1011-1013 and a reader 1020. Objects 1001-1003 to be identified that are bundled by the high-tensile belt-type tags 1011-1013 are further illustrated in FIG. 10.

The high-tensile belt-type tags 1011-1013 of the present embodiment can be implemented by the high-tensile belt-type tags 100 and 300-900 of the first to the eighth embodiments. During the operation, the reader 1020 reads the radio frequency signals respectively transmitted by the high-tensile belt-type tags 1011-1013. Then, the reader 1020 further identifies the objects 1001-1003 bundled by the high-tensile belt-type tags 1011-1013 according to read results. In this way, the wireless RFID system 1000 can trace, identify and monitor the objects 1001-1003.

Moreover, when the theft removes the high-tensile belt-type tags 1011-1013 from the object 1001-1003 to be identified, the reader 1020 cannot receive the identification codes respectively transmitted by the high-tensile belt-type tags 1011-1013, so that the reader 1020 can determine that the objects 1001-1003 to be identified have been stolen or replaced. In this way, the wireless RFID system 1000 may have perfect anti-counterfeiting and anti-theft mechanisms. The other detailed working principles of the present embodiment and detailed structures of the high-tensile belt-type tags 1011-1013 are similar to that of the aforementioned embodiments, and therefore detailed descriptions thereof are not repeated.

In summary, the high-tensile transmission line can be used to increase the tensile strength of the belt, so as to increase the application level of the belt. Moreover, based on a mechanism that the belt can only be tightened and cannot be loosed, and the high-tensile transmission line encircled the whole belt in accordance with a shape of the belt, the belt and the high-tensile transmission line have to be simultaneously cut off in order to remove the high-tensile belt-type tag. In this way, when the theft removes the high-tensile belt-type tag from the object to be identified, the RFID chip cannot deliver the identification code through the antenna due to split of the high-tensile transmission line, which may indicate that the object to be identified has been stolen or replaced by a fake one. In other words, the high-tensile belt-type tag of the present invention can not only be applied in applications of commodity tracing, identifying and monitoring, but can also increase the anti-counterfeiting and anti-theft functions of the commodities.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A high-tensile belt-type tag, comprising:
    a belt, comprising a belt body and a retaining ring, wherein the belt body is suitable to slip into an opening of the retaining ring for preventing the belt body from slipping out of the opening;
    a high-tensile transmission line, disposed in the belt, and encircling the belt in accordance with a shape of the belt;
    an antenna, disposed in the belt, and electrically coupled to the high-tensile transmission line;
    a radio frequency identification (RFID) chip, disposed in the belt, and electrically coupled to the antenna through the high-tensile transmission line, wherein when the high-tensile transmission line is split as the belt is cut off, the RFID chip is unable to deliver an identification code through the antenna due to split of the high-tensile transmission line; and
    a loop short-circuit device, fixed in the opening of the retaining ring, and electrically connected to two non-conducted line segments in the high-tensile transmission line for preventing normal operations of the RFID chip and the antenna, wherein when the belt body is slipped into the opening of the retaining ring, the loop short-circuit device is squeezed by the belt body and is split, so that the RFID chip and the antenna are able to normally operate.

2. The high-tensile belt-type tag as claimed in claim 1, further comprising:
    an impedance matching circuit, disposed in the belt and electrically coupled between the antenna and the RFID chip through the high-tensile transmission line, for matching an impedance of the antenna to an impedance of the RFID chip.

3. The high-tensile belt-type tag as claimed in claim 2, wherein the antenna, the RFID chip and the impedance matching circuit are disposed in the belt body, and the high-tensile transmission line is distributed in the belt body and the retaining ring for electrically connecting the antenna, the impedance matching circuit and the RFID chip, sequentially.

4. The high-tensile belt-type tag as claimed in claim 2, wherein the antenna is disposed in the retaining ring, the RFID chip and the impedance matching circuit are disposed in the belt body, and the high-tensile transmission line is distributed in the belt body and the retaining ring for electrically connecting the antenna, the impedance matching circuit and the RFID chip, sequentially.

5. The high-tensile belt-type tag as claimed in claim 2, wherein the antenna is disposed in the belt body, the RFID chip and the impedance matching circuit are disposed in the retaining ring, and the high-tensile transmission line is distributed in the belt body and the retaining ring for electrically connecting the antenna, the impedance matching circuit and the RFID chip, sequentially.

6. The high-tensile belt-type tag as claimed in claim 2, wherein the antenna, the RFID chip and the impedance matching circuit are disposed in the retaining ring, and the high-tensile transmission line is distributed in the belt body and the retaining ring for electrically connecting the antenna, the impedance matching circuit and the RFID chip, sequentially.

7. The high-tensile belt-type tag as claimed in claim 1, wherein a material of the belt body comprises plastic, rubber, silicone, synthetic materials or polymeric materials.

8. The high-tensile belt-type tag as claimed in claim 1, wherein the high-tensile transmission line is a steel cable.

9. The high-tensile belt-type tag as claimed in claim 1, wherein the RFID chip is a passive RFID chip or an active RFID chip.

10. A wireless radio frequency identification (RFID) system, comprising:
    a plurality of high-tensile belt-type tags, wherein each of the high-tensile belt-type tags comprises:
        a belt, comprising a belt body and a retaining ring, wherein the belt body is suitable to slip into an opening of the retaining ring for preventing the belt body from slipping out of the opening;
        a high-tensile transmission line, disposed in the belt, and encircling the belt in accordance with a shape of the belt;
        an antenna, disposed in the belt, and electrically coupled to the high-tensile transmission line; and
        an RFID chip, disposed in the belt, and electrically coupled to the antenna through the high-tensile transmission line, wherein when the high-tensile transmission line is split as the belt is cut off, the RFID chip is unable to deliver an identification code through the antenna due to split of the high-tensile transmission line;
    a reader, configured to read the identification codes sent by the high-tensile belt-type tags, and identify objects that are bundled by the high-tensile belt-type tags according to a read result; and a loop short-circuit device, fixed in the opening of the retaining ring, and electrically connected to two non-conducted line segments in the high-tensile transmission line for preventing normal operations of the RFID chip and the antenna, wherein when the belt body is slipped into the opening of the retaining ring, the loop short-circuit device is squeezed by the belt body and is split, so that the RFID chip and the antenna are able to normally operate.

11. The wireless RFID system as claimed in claim 10, wherein when the reader is unable to receive the identification codes sent by the high-tensile belt-type tags, the reader determines that the objects that are bundled by the high-tensile belt-type tags have been stolen or replaced.

12. The wireless RFID system as claimed in claim 10, wherein each of the high-tensile belt-type tags comprises:
an impedance matching circuit, disposed in the belt and electrically coupled between the antenna and the RFID chip through the high-tensile transmission line, for matching an impedance of the antenna to an impedance of the RFID chip.

13. The wireless RFID system as claimed in claim 12, wherein the high-tensile transmission line is distributed in the belt body and the retaining ring for electrically connecting the antenna, the impedance matching circuit and the RFID chip, sequentially.

14. The wireless RFID system as claimed in claim 10, wherein a material of the belt body comprises plastic, rubber, silicone, synthetic materials or polymeric materials.

15. The wireless RFID system as claimed in claim 10, wherein the high-tensile transmission line is a steel cable.

16. The wireless RFID system as claimed in claim 10, wherein the RFID chip is a passive RFID chip or an active RFID chip.

* * * * *